United States Patent

Sakaguchi et al.

[11] Patent Number: 6,143,266
[45] Date of Patent: Nov. 7, 2000

[54] METHOD FOR PRODUCING CRYSTALLINE INORGANIC BUILDERS

[75] Inventors: Mikio Sakaguchi; Ichiro Sakamoto; Kazuhiro Otsuka; Masaharu Jyono, all of Wakayama, Japan

[73] Assignee: Kao Corporation, Tokyo, Japan

[21] Appl. No.: 09/125,815

[22] PCT Filed: Jan. 14, 1998

[86] PCT No.: PCT/JP98/00147

§ 371 Date: Aug. 26, 1998

§ 102(e) Date: Aug. 26, 1998

[87] PCT Pub. No.: WO98/31631

PCT Pub. Date: Jul. 23, 1998

[30] Foreign Application Priority Data

Jan. 17, 1997 [JP] Japan ..................................... 9-19892

[51] Int. Cl.[7] .......................... C01B 33/24; C01B 33/32; C01B 33/20
[52] U.S. Cl. .......................... 423/331; 423/326; 423/332; 423/334
[58] Field of Search .................................. 423/326, 331, 423/332, 334

[56] References Cited

U.S. PATENT DOCUMENTS

| | | | |
|---|---|---|---|
| 4,294,810 | 10/1981 | Taga et al. | 423/331 |
| 5,084,262 | 1/1992 | Novotny et al. | 423/333 |
| 5,238,668 | 8/1993 | Novotny et al. | 423/333 |
| 5,356,607 | 10/1994 | Just | 423/334 |
| 6,027,560 | 6/2000 | Sakaguchi et al. | |

FOREIGN PATENT DOCUMENTS

| | | |
|---|---|---|
| 49-21240 | 5/1974 | Japan . |
| 8-290913 | 11/1996 | Japan . |

*Primary Examiner*—Steven P. Griffin
*Assistant Examiner*—Christina Ildebrando
*Attorney, Agent, or Firm*—Birch, Stewart, Kolasch & Birch, LLP

[57] ABSTRACT

A method for producing a crystalline inorganic builder having the following composition in its anhydrous form: $xM_2O \cdot ySiO_2 \cdot zMeO$, wherein x, y and z are numerical values satisfying the following relationships: y/x is 1.0 to 4.0, z/y is not more than 1.0, M stands for Na and K, K/Na is 0.01 to 2.0, and Me stands for Ca and/or Mg, the method comprising the steps of (a) adding water, a Na-containing compound, a K-containing compound, and at least one member of Ca-containing compounds and Mg-containing compounds to silica sand, to give a mixture; (b) subjecting the resulting mixture to a hydrothermal treatment; and (c) baking the resulting treated mixture. Also, a method for producing a crystalline inorganic builder having the following composition in its anhydrous form: $xM_2O \cdot ySiO_2$, wherein x and y are numerical values satisfying the following relationships: y/x is 1.0 to 4.0, M stands for Na and K, K/Na is 0.01 to 2.0, the method comprising the steps of (a) adding water, a Na-containing compound, a K-containing compound to silica sand, to give a mixture; (b) subjecting the resulting mixture to a hydrothermal treatment; and (c) baking the resulting treated mixture.

8 Claims, No Drawings

METHOD FOR PRODUCING CRYSTALLINE INORGANIC BUILDERS

This application is the national phase under 35 U.S.C. §371 of prior PCT International Application No. PCT/JP98/00147 which has an International filing date of Jan. 14, 1998 which designated the United States of America, the entire contents of which are hereby incorporated by reference.

TECHNICAL FIELD

The present invention relates to a method for producing crystalline inorganic silicate builders useful for ion exchangers and alkalizers.

BACKGROUND ART

Since silicate builders have alkaline buffering properties, they are highly useful for detergent builders. Particularly, since the silicate builders in crystalline forms have excellent cationic exchange capacities, they are greatly useful for detergent builders.

Among methods for producing the silicate builders, Japanese Patent Laid-Open No. 5-66888 discloses a method using water glass as a starting material. In this method, a crystalline sodium silicate having a layered structure is produced by a method comprising the steps of spray-drying a water glass solution to form amorphous sodium silicate, and heating the resulting amorphous sodium silicate in a firing zone while recirculating a portion of the product. However, this method requires drying off large amounts of the water content from the water glass, which makes it disadvantageous from an energy-saving viewpoint.

Japanese Patent Laid-Open No. 6-72008 discloses a method for directly baking the glassy product to solve the above problems. In this method, crystalline sodium silicate is produced by the steps of pulverizing a water glass product obtainable by cooling a fused mixture of sand and soda, and then heating the pulverized product. However, in this method, since the resulting product comprises a two-component system of $Na_2O$—$SiO_2$, the control of the crystalline system becomes difficult, rendering its performance as an ion exchange material for detergents unsatisfactory. Also, a large amount of heat energy is consumed upon glassification, thereby making it disadvantageous from an energy-saving viewpoint.

In view of the above problems, an object of the present invention is to provide a method for easily producing a high-performance silicate builder using inexpensive silica sand as a starting material.

These and other objects of the present invention will be apparent from the following description.

DISCLOSURE OF THE INVENTION

In sum, the present invention pertains to the following:
(1) A method for producing a crystalline inorganic builder having the following composition in its anhydrous form:

$$xM_2O.ySiO_2.zMeO,$$ 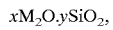

wherein x, y and z are numerical values satisfying the following relationships: y/x is 1.0 to 4.0, z/y is not more than 1.0, M stands for Na and K, K/Na is 0.01 to 2.0, and Me stands for Ca and/or Mg, the method comprising the steps of:
(a) adding water, an Na-containing compound, a K-containing compound, and at least one member of Ca-containing compounds and Mg-containing compounds to silica sand, to give a mixture;
(b) subjecting the resulting mixture to a hydrothermal treatment; and
(c) baking the resulting treated mixture; and
(2) A method for producing a crystalline inorganic builder having the following composition in its anhydrous form:

$$xM_2O.ySiO_2,$$

wherein x and y are numerical values satisfying the following relationship: y/x is 1.0 to 4.0, M stands for Na and K, and K/Na is 0.01 to 2.0, the method comprising the steps of:
(a) adding water, an Na-containing compound, and a K-containing compound to silica sand, to give a mixture;
(b) subjecting the resulting mixture to a hydrothermal treatment; and
(c) baking the resulting treated mixture.

BEST MODE FOR CARRYING OUT THE INVENTION

The method for producing a crystalline inorganic builder having a particular composition, comprising the steps of:
(a) adding water, an Na-containing compound, and a K-containing compound, and optionally at least one member of Ca-containing compounds and Mg-containing compounds to silica sand, to give a mixture;
(b) subjecting the resulting mixture to a hydrothermal treatment; and
(c) baking the resulting treated mixture.

In other words, the method is characterized by the incorporation of potassium and optionally alkaline earth metals into the above crystalline inorganic silicates using inexpensive silica sand and by specific preparation conditions of the materials for baking. The method of the present invention will be explained in detail below.

The crystalline inorganic silicates in the present invention have the following compositions:
First Embodiment: $xM_2O.ySiO_2.zMeO$ (anhydrous form), wherein x, y and z are numerical values satisfying the following relationships: y/x is 1.0 to 4.0, z/y is not more than 1.0, M stands for Na and K, K/Na is 0.01 to 2.0, and Me stands for Ca and/or Mg.
Second Embodiment: $xM_2O.ySiO_2$ (anhydrous form), wherein x and y are numerical values satisfying the following relationship: y/x is 1.0 to 4.0, M stands for Na and K, and K/Na is 0.01 to 2.0.

It is desired that the silica sand usable in the present invention has an $SiO_2$ content of not less than 90% by weight, preferably not less than 95% by weight, more preferably not less than 97% by weight. Concrete examples of these silica sands include pearl sand and flattery sand produced in Australia; Sarawak sand produced in Indonesia; silica sand prepared by disintegrating silica rock, and the like.

The shapes and sizes of the silica sands are not particularly limited, and from the viewpoint of reactivity, the silica sands preferably have a maximum particle size of not more than 5000 m.

The Na-containing compounds and the K-containing compounds usable in the present invention include hydroxides, carbonates, nitrates, sulfates, etc. of potassium and sodium. Specific examples thereof include NaOH, KOH, $Na_2CO_3$, $K_2CO_3$, $NaNO_3$, $KNO_3$, $Na_2SO_4$, $K_2SO_4$, and the like. The amount of the Na-containing compound and the amount of the K-containing compound is determined by the composition of the desired crystalline inorganic silicate.

In the present invention, water is added alone, or it is added in the form of an aqueous solution of at least one member of an Na-containing compound and a K-containing compound, where water component is substantially present therein. Here, the aqueous solutions separately containing an Na-containing compound or a K-containing compound can be used, or the aqueous solution containing both an Na-containing compound and a K-containing compound can be used. Also, water and the aqueous solution can be used in combination.

In the case where the Na-containing compound and the K-containing compound are added in the form of separate aqueous solutions, the concentration of each of the aqueous solution is from 20 to 70% by weight. It is desired that the concentration of each of the aqueous solution of an Na-containing compound and the aqueous solution of a K-containing compound and amounts thereof are adjusted such that the water content added as aqueous solutions is preferably from 24 to 50% by weight, particularly from 36 to 48% by weight, to the entire weight of the starting materials. In the case of using the aqueous solution containing both the Na-containing compound and the K-containing compound, the concentration of the aqueous solution is from 20 to 70% by weight. Alternatively, in the case where water is added alone, the water content in the entire starting material is adjusted to preferably from 24 to 50% by weight, particularly from 36 to 48% by weight.

Thus, the water content in the resulting starting material mixture obtained in step (a) is preferably from 24 to 50% by weight, particularly from 36 to 48% by weight. The water content is preferably at most 50% by weight in order to prevent necessitating an excessive energy upon baking. On the other hand, the water content is preferably at least 24% by weight in order to give sufficient effects by the hydrothermal treatment, so that the crystallization upon baking can be well proceeded, thereby remarkably improving in its anti-solubility in water and ion exchange properties.

The Ca-containing compounds and the Mg-containing compounds usable in the production of the crystalline inorganic silicate of First Embodiment of the present invention include oxides, hydroxides, carbonates, nitrates, chlorides, sulfates, etc. of calcium and magnesium. Concrete examples thereof include $CaCO_3$, $MgCO_3$, $Ca(OH)_2$, $Mg(OH)_2$, $MgO$, $CaCl_2 \cdot nH_2O$, $MgCl_2 \cdot nH_2O$, $Ca(NO_3)_2 \cdot nH_2O$, $Mg(NO_3)_2 \cdot nH_2O$, $CaSO_4 \cdot nH_2O$, $MgSO_4 \cdot nH_2O$, and the like (In each hydrate, n is usually a number of from 0 to 20.). Just as in the case of the Na-containing compound and the K-containing compound, the amount of the Ca-containing compound or the Mg-containing compound added is determined by the composition of the desired crystalline inorganic silicate. In the present invention, from the viewpoint of reactivity, it is desired that the hydrothermal treatment is carried out after the addition of the Ca-containing compound or the Mg-containing compound.

The method for producing a crystalline inorganic builder of the present invention comprises (a) adding water, an Na-containing compound and a K-containing compound, and optionally at least one member of Ca-containing compounds and Mg-containing compounds to silica sand, to give a mixture; (b) subjecting the resulting mixture to a hydrothermal treatment; and (c) baking the resulting treated mixture. The mixture is subjected to a hydrothermal treatment and then baked in order to increase reactivity, to thereby accelerate crystallization.

Here, the hydrothermal treatment is a procedure of dissolving silica sand in an aqueous alkaline solution under pressure. It is desired that the hydrothermal treatment is carried out under the conditions of from 5 to 15 kg/cm² G, preferably from 7 to 12 kg/cm² G, more preferably from 8 to 10 kg/cm² G, and that the treatment temperature is from 150° to 200° C., preferably from 160° to 190° C., more preferably from 170° to 180° C. The treatment period of time is not particularly limited, and it is desired that the treatment period of time is from 1 to 24 hours.

The baking may be carried out in the present invention by any of the generally known methods, including a process comprising the steps of baking the starting materials after the hydrothermal treatment at a temperature usually ranging from 300° to 1500° C., preferably from 500° to 1300° C., more preferably from 520° to 900° C., to crystallize the resulting product. The heating temperature is not less than 300° C. from the viewpoints of carrying out sufficient crystallization and giving sufficient anti-solubility in water, and when the heating temperature is not more than 1500° C., coarse grains are less likely to form, so that excellent ion exchange capacity can be achieved in the resulting inorganic builder. The heating time is usually 0.1 to 24 hours. Such baking can usually be carried out in a heating furnace, such as an electric furnace or a gas furnace.

The baked product may be pulverized, where necessary, to a given granularity. The pulverization is achieved using a ball mill, a roller mill or any other mechanical mills.

The crystalline inorganic builder of the present invention may be easily formed into a hydrate by any known method without limitation. For example, a hydrate of an inorganic builder can be obtained by suspending the anhydride of the above inorganic builder in ion-exchanged water to form a hydrate, which is then dried to yield a powder.

The crystalline inorganic builder obtainable by the method of the present invention described above has one of the following compositions:

First Embodiment: $xM_2O \cdot ySiO_2 \cdot zMeO$ (anhydrous form), wherein x, y and z are numerical values satisfying the following relationships: y/x is 1.0 to 4.0, z/y is not more than 1.0, M stands for Na and K, K/Na is 0.01 to 2.0, and Me stands for Ca and/or Mg.

Second Embodiment: $xM_2O \cdot ySiO_2$ (anhydrous form), wherein x and y are numerical values satisfying the following relationships: y/x is 1.0 to 4.0, M stands for Na and K, and K/Na is 0.01 to 2.0.

In the present invention, from the viewpoint of structural stability in water, in First Embodiment, it is desired that x, y and z are numerical values satisfying the following relationships: y/x is 1.5 to 2.5, and z/y is not more than 1.0, preferably from 0.005 to 1.0, and that K/Na is 0.02 to 1.0. In Second Embodiment, it is desired that x and y are numerical values satisfying the following relationship: y/x is 1.5 to 2.5, and that K/Na is 0.02 to 1.0. In the composition in the present invention which positively incorporates K, besides a remarkable increase in the ion exchange capacity, since K more suitably acts on the silica net work in water as compared to Na, even when silica sand is used, the amount of the undissolved product after the hydrothermal treatment is small, thereby making it easy to form a precursor of a crystalline inorganic silicate by a relatively low-temperature hydrothermal treatment. According to the method of the present invention, the filtration step can also be omitted, thereby enjoying great industrial merits. Since substantially no products remain undissolved, crystals having excellent ion exchange properties can be easily produced by baking.

Since the crystalline inorganic builders mentioned above have excellent ion exchange capacity, ion exchange speed, alkalizing ability, and anti-solubility in water, they are highly useful as ion exchangers and alkalizers. Therefore, the present invention provides a detergent composition containing the crystalline inorganic builder described above. In addition, a clothes detergent containing this detergent composition may be also prepared therefrom.

The present invention will be explained in detail below by the following working examples, without intending to limit the scope of the present invention thereto. Incidentally, Examples 1 to 12 correspond to First Embodiment, and Examples 13 to 21 correspond to Second Embodiment.

In the following Examples and Comparative Examples, the ion exchange property was evaluated by the following method. Specifically, a 0.04 g sample pulverized to a size of 325 mesh-pass (average particle size: $10 \pm 2 \mu m$; measured by a laser diffraction particle size analyzer, "LA-500," manufactured by Horiba, LTD.) is accurately weighed and added to 100 ml of a calcium chloride aqueous solution (100 ppm concentration, when calculated as $CaCO_3$), followed by stirring at 10° C. for 1 minute. Thereafter, the mixture is filtered using a membrane filter of 0.2 $\mu m$ pore size. 10 ml of the filtrate is assayed for Ca content by an EDTA titration. In the evaluation for the ion exchange property, the values found were expressed in $CaCO_3$ mg/g.min in the following Examples and Comparative Examples.

The product undissolved after a hydrothermal treatment was filtered using a filter paper No. 5c, and the weight of the filtration residue was measured.

EXAMPLE 1

232.6 g of silica sand ("FLATTERYSAND" produced in Australia; $SiO_2$ purity: 99.8%; average particle size: 150 $\mu m$), 283.2 g of a 48% by weight NaOH aqueous solution, 135.9 g of a 48% by weight KOH aqueous solution, 5.74 g of a $Ca(OH)_2$ aqueous solution, and 0.90 g of $Mg(OH)_2$ were blended. The resulting mixture was placed in a nickel crucible and subjected to a hydrothermal treatment at 9.5 kg/cm² G for four hours. No undissolved product was found.

The treated product was baked in the nickel crucible without filtration in an electric furnace at 600° C. for five hours. After baking, the baked product was pulverized to a size of 325 mesh-pass, to give an inorganic builder powder 1.

The composition and the results of the ion exchange property of the resulting builder are shown in Table 2 together with its production conditions. Also, the obtained powdered inorganic builder gave crystallinity by an X-ray diffraction pattern. In addition, it had excellent ion exchange property.

EXAMPLES 2 to 21

The same procedures as in Example 1 were carried out except for preparing the starting materials for baking as given in Table 1, and for changing the compositions, the hydrothermal treatment conditions and the baking temperatures as given in Table 2, to give each of the inorganic builder powders 2 to 21. The results of the ion exchange property of each of the resulting builder powders are shown in Table 2. All of the resulting builder powders gave crystallinity and had excellent ion exchange properties.

Comparative Example 1

The same procedures as in Example 1 were carried out except for using 244.2 g of silica sand and 339.2 g of a 48% by weight NaOH aqueous solution, to give a comparative inorganic builder powder 1. In this example, a slight amount of undissolved product remained after the hydrothermal treatment.

The results of the ion exchange property of the resulting builder are shown in Table 2, and it was notably poorer than those of Examples, though this comparative powder showed crystallinity.

Comparative Examples 2 to 5

The same procedures as in Comparative Example 1 were carried out except for preparing the starting materials for baking as given in Table 1, and for changing the compositions, the hydrothermal treatment conditions and the baking temperatures as given in Table 2, to give each of the comparative inorganic builder powders 2 to 5. The ion exchange property of each of the resulting builder powders are shown in Table 2. All of the resulting builder powders gave notably poorer ion exchange properties as compared to those of Examples.

TABLE 1

| | Silica Sand | Na Starting Material | | K Starting Material | | | Ca Starting Material | | Mg Starting Material | | Water Content |
|---|---|---|---|---|---|---|---|---|---|---|---|
| | (g) | | (wt %)* | (g) | | (wt %)* | (g) | | (g) | | (g) | (wt %) |
| Example Nos. | | | | | | | | | | | | |
| 1 | 232.6 | NaOH | 48 | 283.2 | KOH | 48 | 135.9 | $Ca(OH)_2$ | 5.74 | $Mg(OH)_2$ | 0.90 | 33.1 |
| 2 | 240.4 | $Na_2CO_3$ | 20 | 840.7 | $K_2CO_3$ | 50 | 176.7 | $CaCO_3$ | 1.20 | $MgCO_3$ | 2.36 | 60.3 |
| 3 | 249.8 | $Na_2CO_3$ | 25 | 628.5 | KOH | 48 | 165.7 | $CaCO_3$ | 10.41 | $Mg(OH)_2$ | 5.26 | 52.6 |
| 4 | 277.3 | NaOH | 60 | 197.3 | KOH | 40 | 233.2 | $CaCO_3$ | 11.53 | — | — | 30.4 |
| 5 | 247.2 | $NaNO_3$ | 40 | 885.7 | $K_2CO_3$ | 40 | 142.6 | $CaCO_3$ | 24.72 | $Mg(OH)_2$ | 4.80 | 45.4 |
| 6 | 252.0 | NaOH | 48 | 343.9 | $K_2CO_3$ | 40 | 116.2 | $CaCO_3$ | 10.50 | $MgCO_3$ | 26.55 | 33.2 |
| 7 | 218.3 | $Na_2CO_3$ | 25 | 770.9 | $K_2CO_3$ | 60 | 33.5 | $Ca(OH)_2$ | 53.84 | $MgCO_3$ | 15.31 | 54.2 |
| 8 | 215.9 | $Na_2CO_3$ | 30 | 350.2 | $K_2CO_3$ | 30 | 548.0 | — | — | $MgCO_3$ | 15.17 | 55.7 |
| 9 | 175.2 | $Na_2SO_4$ | 25 | 594.7 | $K_2CO_3$ | 20 | 578.6 | $Ca(OH)_2$ | 64.69 | $Mg(OH)_2$ | 33.97 | 62.8 |
| 10 | 154.0 | $Na_2CO_3$ | 20 | 680.0 | KOH | 60 | 144.0 | $Ca(OH)_2$ | 57.05 | $Mg(OH)_2$ | 67.34 | 54.6 |
| 11 | 127.7 | NaOH | 48 | 177.4 | KOH | 48 | 248.8 | $Ca(OH)_2$ | 78.84 | $MgCO_3$ | 89.71 | 30.7 |
| 12 | 129.9 | NaOH | 48 | 1049.7 | $K_2CO_3$ | 50 | 113.3 | $Ca(OH)_2$ | 1.28 | $MgCO_3$ | 0.37 | 46.5 |
| 13 | 265.3 | $Na_2CO_3$ | 30 | 734.0 | KOH | 48 | 31.1 | — | — | — | — | 51.4 |
| 14 | 249.1 | $Na_2CO_3$ | 30 | 739.4 | $K_2CO_3$ | 30 | 98.4 | — | — | — | — | 54.0 |
| 15 | 240.4 | $Na_2CO_3$ | 30 | 719.9 | $K_2CO_3$ | 30 | 1117.3 | — | — | — | — | 54.8 |
| 16 | 228.2 | $Na_2CO_3$ | 25 | 215.0 | $K_2CO_3$ | 48 | 219.0 | — | — | — | — | 41.5 |
| 17 | 220.1 | $Na_2CO_3$ | 30 | 162.0 | KOH | 48 | 107.2 | — | — | — | — | 34.6 |

TABLE 1-continued

| | Silica Sand (g) | Na Starting Material | | | K Starting Material | | | Ca Starting Material | | Mg Starting Material | | Water Content |
|---|---|---|---|---|---|---|---|---|---|---|---|---|
| | | | (wt %)* | (g) | | (wt %)* | (g) | | (g) | | (g) | (wt %) |
| 18 | 268.5 | NaOH | 60 | 227.3 | KOH | 48 | 199.2 | — | — | — | — | 28.0 |
| 19 | 241.0 | Na$_2$CO$_3$ | 30 | 843.1 | K$_2$CO$_3$ | 30 | 22.0 | — | — | — | — | 54.7 |
| 20 | 252.4 | NaOH | 65 | 139.9 | K$_2$CO$_3$ | 50 | 314.3 | — | — | — | — | 29.2 |
| 21 | 238.1 | NaOH | 48 | 227.9 | KOH | 48 | 172.0 | — | — | — | — | 32.6 |
| Comparative Example Nos. | | | | | | | | | | | | |
| 1 | 244.2 | NaOH | 48 | 339.2 | — | — | — | — | — | — | — | 30.2 |
| 2 | 265.7 | Na$_2$CO$_3$ | 5 | 2346.6 | — | — | — | — | — | — | — | 80.8 |
| 3 | 239.9 | Na$_2$CO$_3$ | 20 | 1284.1 | — | — | — | CaCO$_3$ | 2.8 | MgCO$_3$ | 1.0 | 67.2 |
| 4 | 273.1 | NaOH | 48 | 421.5 | — | — | — | CaCO$_3$ | 7.3 | Mg(OH)$_2$ | 1.5 | 31.2 |
| 5 | 214.9 | Na$_2$CO$_3$ | 48 | 527.2 | — | — | — | Ca(OH)$_2$ | 10.6 | — | — | 36.4 |

Remark *: wt % expressing the concentration of the aqueous solutions.

TABLE 2

| | M$_2$O | | MeO | | | Hydrothermal Treatment Condition | Amount of Undissolved Product | Baking Temp. | Ion Exchange Property (CaCO$_3$mg/ |
|---|---|---|---|---|---|---|---|---|---|
| | y/x | K/Na | z/y | $z_1$/y* | $z_2$/y* | (kg/cm$^2$G) | (wt %) | (° C.) | g · min) |
| Example Nos. | | | | | | | | | |
| 1 | 1.70 | 0.342 | 0.020 | 0.016 | 0.004 | 9.5 | 0.0 | 600 | 138 |
| 2 | 1.80 | 0.403 | 0.010 | 0.003 | 0.007 | 9.5 | 0.0 | 600 | 146 |
| 3 | 1.90 | 0.478 | 0.010 | 0.025 | 0.015 | 9.5 | 0.0 | 600 | 142 |
| 4 | 2.00 | 0.562 | 0.025 | 0.025 | 0.000 | 5.5 | 0.5 | 580 | 145 |
| 5 | 1.65 | 0.198 | 0.080 | 0.060 | 0.020 | 5.5 | 0.5 | 620 | 133 |
| 6 | 1.75 | 0.163 | 0.100 | 0.025 | 0.075 | 5.5 | 0.3 | 650 | 124 |
| 7 | 1.85 | 0.080 | 0.250 | 0.200 | 0.050 | 12.0 | 0.0 | 720 | 108 |
| 8 | 1.65 | 1.200 | 0.050 | 0.000 | 0.050 | 12.0 | 0.0 | 500 | 103 |
| 9 | 1.55 | 0.800 | 0.500 | 0.300 | 0.200 | 12.0 | 0.0 | 600 | 107 |
| 10 | 1.25 | 0.600 | 0.750 | 0.300 | 0.450 | 14.5 | 0.0 | 500 | 104 |
| 11 | 1.00 | 1.000 | 1.000 | 0.500 | 0.500 | 14.0 | 0.0 | 980 | 104 |
| 12 | 0.50 | 0.100 | 0.010 | 0.008 | 0.002 | 14.0 | 0.0 | 900 | 108 |
| 13 | 2.00 | 0.064 | — | — | — | 14.0 | 0.0 | 700 | 102 |
| 14 | 1.80 | 0.102 | — | — | — | 7.0 | 0.0 | 680 | 105 |
| 15 | 1.70 | 0.157 | — | — | — | 7.0 | 0.0 | 600 | 111 |
| 16 | 3.00 | 1.500 | — | — | — | 15.0 | 0.0 | 600 | 116 |
| 17 | 4.00 | 1.000 | — | — | — | 15.0 | 0.0 | 700 | 108 |
| 18 | 1.75 | 0.500 | — | — | — | 10.0 | 0.0 | 600 | 128 |
| 19 | 1.65 | 0.020 | — | — | — | 10.0 | 0.0 | 1300 | 106 |
| 20 | 1.85 | 1.000 | — | — | — | 10.0 | 0.0 | 500 | 109 |
| 21 | 2.00 | 0.538 | — | — | — | 10.0 | 0.0 | 620 | 170 |
| Comparative Example Nos. | | | | | | | | | |
| 1 | 2.00 | 0 | — | — | — | 9.5 | 7.1 | 650 | 97 |
| 2 | 2.00 | 0 | — | — | — | 7.0 | 10.2 | 700 | 87 |
| 3 | 1.65 | 0 | 0.010 | 0.007 | 0.003 | 7.0 | 6.2 | 650 | 88 |
| 4 | 1.80 | 0 | 0.020 | 0.016 | 0.004 | 7.0 | 8.1 | 450 | 68 |
| 5 | 1.50 | 0 | 0.040 | 0.040 | 0.000 | 7.0 | 5.6 | 580 | 91 |

Remark *: Expressing molar ratios when zMeO is z1CaO.z2MgO.

Industrial Applicability

According to a method for producing a crystalline inorganic builder of the present invention, high-performance silicate builders can be produced in a simple manner by using inexpensive silica sand.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a crystalline inorganic builder having the following composition in its anhydrous form:

$x\text{M}_2\text{O}.y\text{SiO}_2.z\text{MeO},$ wherein x, y and z are numerical values satisfying the following relationships: y/x is 1.0 to 4.0, z/y is not more than 1.0, M stands for Na and K, K/Na is 0.01 to 2.0, and Me stands for Ca and/or Mg, the method comprising the steps of:

(a) adding water, a Na-containing compound, a K-containing compound, and at least one member of Ca-containing compounds and Mg-containing compounds to silica sand, to give a mixture;

(b) subjecting the resulting mixture to a hydrothermal treatment, wherein said hydrothermal treatment is carried out under the condition of from 5 to 15 kg/cm² G, thereby dissolving the silica sand in the mixture; and thereafter (c) baking the resulting treated mixture.

2. The method according to claim 1, wherein the Na-containing compound and the K-containing compound are selected from the group consisting of NaOH, KOH, $Na_2CO_3$, $K_2CO_3$, $NaNO_3$, $KNO_3$, $Na_2SO_4$, and $K_2SO_4$.

3. The method according to claim 1, wherein the Na-containing compound and the K-containing compound are each supplied as an aqueous solution of the Na-containing compound and an aqueous solution of the K-containing compound, and wherein a concentration of each of the aqueous solution of an Na-containing compound and the aqueous solution of a K-containing compound is from 20 to 70% by weight.

4. The method according to claim 1, wherein the mixture obtained in step (a) has a water content of from 24 to 50% by weight.

5. A method for producing a crystalline inorganic builder having the following composition in its anhydrous form:

$$xM_2O \cdot ySiO_2,$$

wherein x and y are numerical values satisfying the following relationship: y/x is 1.0 to 4.0, M stands for Na and K, and K/Na is 0.01 to 2.0, the method comprising the steps of:

(a) adding water, a Na-containing compound, and a K-containing compound to silica sand, to give a mixture;

(b) subjecting the resulting mixture to a hydrothermal treatment, wherein said hydrothermal treatment is carried out under the condition of from 5 to 15 kg/cm² G, thereby dissolving the silica sand in the mixture; and thereafter (c) baking the resulting treated mixture.

6. The method according to claim 5, wherein the Na-containing compound and the K-containing compound are selected from the group consisting of NaOH, KOH, $Na_2CO_3$, $K_2CO_3$, $NaNO_3$, $KNO_3$, $Na_2SO_4$, and $K_2SO_4$.

7. The method according to claim 5, wherein the Na-containing compound and the K-containing compound are each supplied as an aqueous solution of the Na-containing compound and an aqueous solution of the K-containing compound, and wherein a concentration of each of the aqueous solution of an Na-containing compound and the aqueous solution of a K-containing compound is from 20 to 70% by weight.

8. The method according to claim 5, wherein the mixture obtained in step (a) has a water content of from 24 to 50% by weight.

\* \* \* \* \*